(12) United States Patent  (10) Patent No.: US 7,542,627 B2
Nihashi  (45) Date of Patent: Jun. 2, 2009

(54) READING APPARATUS FOR RECORDING MEDIUM

(75) Inventor: Kiyotake Nihashi, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 994 days.

(21) Appl. No.: 11/075,479

(22) Filed: Mar. 9, 2005

(65) Prior Publication Data

US 2006/0203299 A1  Sep. 14, 2006

(51) Int. Cl.
| H04N 1/04 | (2006.01) |
| G06K 9/00 | (2006.01) |
| G06K 9/20 | (2006.01) |
| G06K 7/08 | (2006.01) |
| G06K 7/00 | (2006.01) |

(52) U.S. Cl. ................... 382/312; 235/449; 235/453; 382/139; 382/320; 358/474

(58) Field of Classification Search ............... 358/474, 358/475; 382/139, 312, 315, 320; 29/806, 29/430; 53/118, 420; 242/520; 396/6, 311, 396/315; 355/40; 235/379, 439, 449, 453, 235/475, 479, 381

See application file for complete search history.

(56) References Cited

U.S. PATENT DOCUMENTS

| 4,166,945 A | * | 9/1979 | Inoyama et al. ............. 235/379 |
| 5,444,616 A | * | 8/1995 | Nair et al. ...................... 705/17 |
| 5,614,968 A | * | 3/1997 | Miyasaka .................... 396/311 |
| 5,615,057 A | * | 3/1997 | Fukuta et al. ................ 386/117 |
| 6,259,808 B1 | * | 7/2001 | Martinez et al. ............ 382/139 |
| 6,263,167 B1 | * | 7/2001 | Kamata et al. .............. 396/311 |
| 2003/0043273 A1 | * | 3/2003 | Suzuki ..................... 348/207.2 |
| 2004/0028447 A1 | * | 2/2004 | Sasaki ......................... 400/578 |
| 2004/0188920 A1 | * | 9/2004 | Washington et al. ......... 271/145 |
| 2005/0150954 A1 | * | 7/2005 | Oguchi ........................ 235/439 |
| 2005/0184144 A1 | * | 8/2005 | Eastman et al. ............. 235/379 |
| 2006/0203299 A1 | * | 9/2006 | Nihashi ....................... 358/474 |

FOREIGN PATENT DOCUMENTS

JP  2001-22878 A  1/2001

* cited by examiner

*Primary Examiner*—Jerome Grant, II
(74) *Attorney, Agent, or Firm*—Frishauf, Holtz, Goodman & Chick, P.C.

(57) ABSTRACT

A reading apparatus reads image information and magnetic information displayed on the surface of a sheet-like recording medium. A scanner and MICR head are placed in a path for conveying a recording medium. The reading apparatus has a pressing roller, and a pressing pad. The pressing roller presses a recording medium to the scanner when reading the image information. The pressing pad presses a recording medium to the MICR head when reading the MICR information. The operations of pressing the pressing roller to the scanner and pressing the pressing pad to the MICR head are performed by one driving mechanism by cooperating the arm, rotation cam, roller lift member and link member.

6 Claims, 14 Drawing Sheets

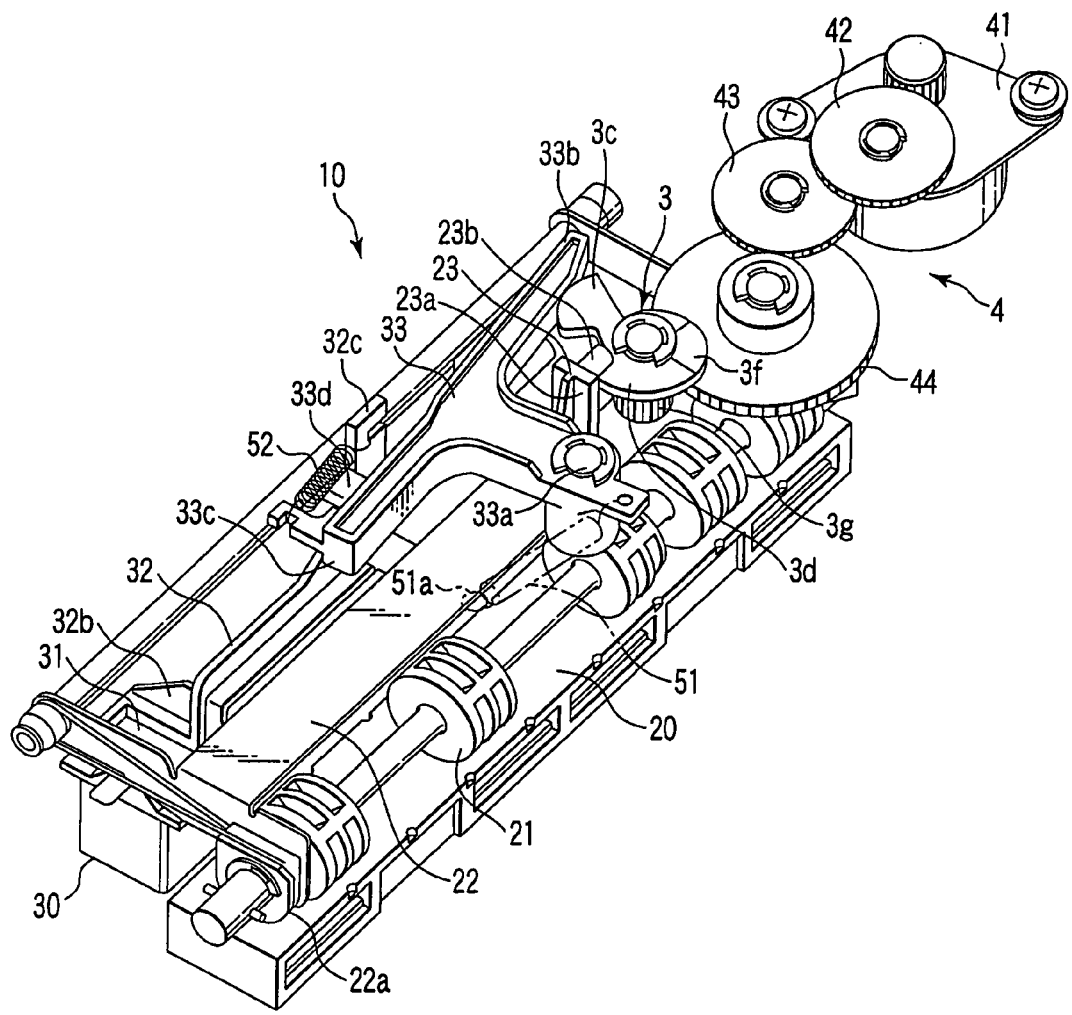
F I G. 7

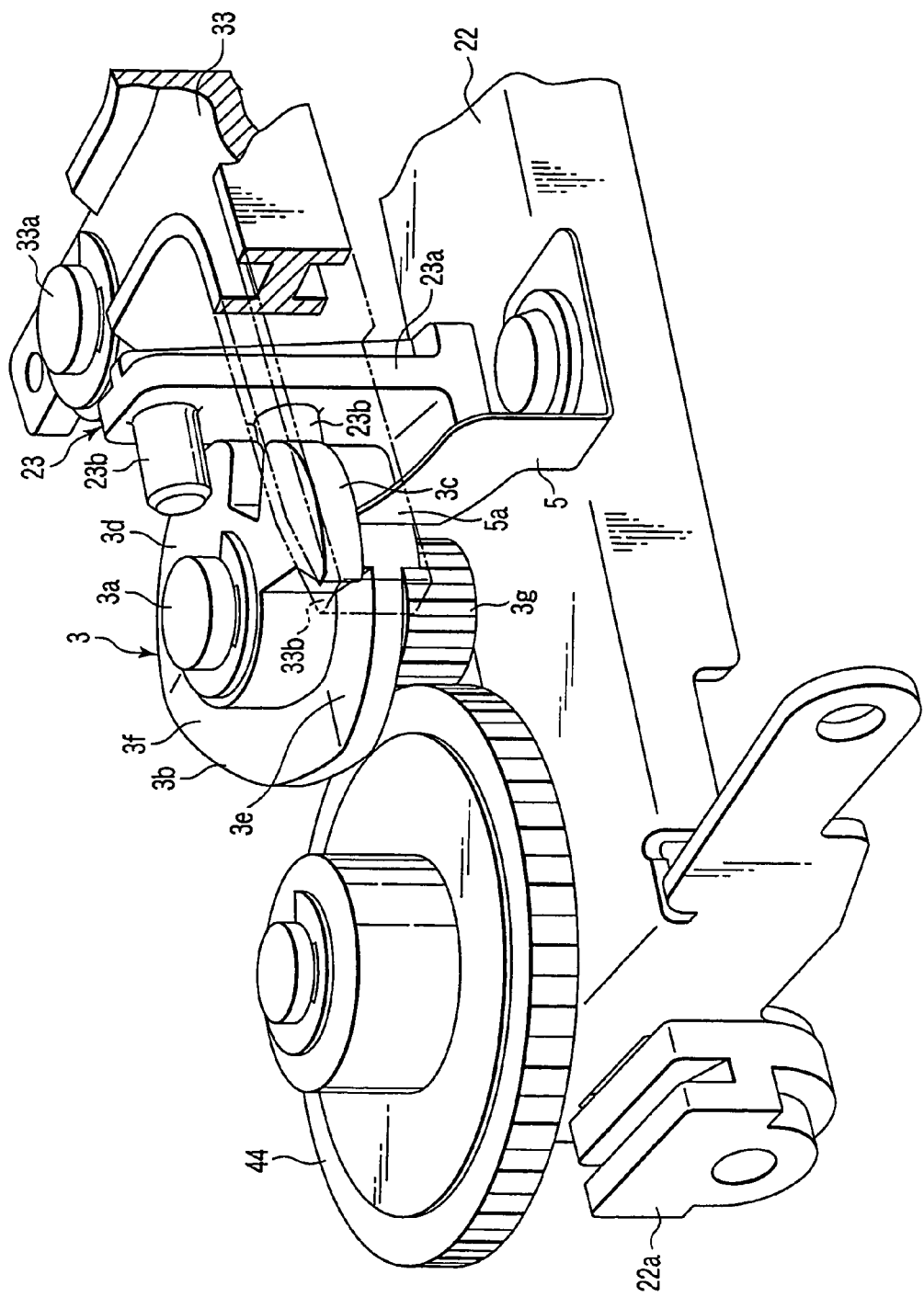
F I G. 10

READING APPARATUS FOR RECORDING MEDIUM

BACKGROUND OF THE INVENTION

1. Field of the Invention

The present invention relates to a reading apparatus having an MICR (Magnetic Ink Character Recognition) reading unit and a scanning unit.

2. Description of the Related Art

Checks and personal checks on which information such as a bank number and account number are recorded, have been widely used as a form of payment in retail establishments. A personal check contains magnetic information printed in magnetic ink. A system, which immediately collates the validity of a personal check used in a shop based on the magnetic information, has been studied.

The fixed form bill processing apparatus disclosed in Jpn. Pat. Appln. KOKAI Publication No. 2001-22878 has a check conveying unit, a check reversing mechanism, a print unit, a magnetic reading unit, a scanning unit, and a control unit. A personal check is inserted from the long side and conveyed in the direction along the short side. A print head of the print unit is mounted on a print carriage and moved along the long side of a personal check. A magnetic head of a magnetic reading unit is mounted on a magnetic head carriage.

The magnetic head carriage and print head carriage are fixed side by side to a guide member. The magnetic head and print head are moved in substantially the same area on the surface of a platen member. The magnetic head carriage is connected to the print carriage through a coupler. In this state, the magnetic head is moved in the direction along the long side of a personal check by a driving mechanism connected to the print carriage.

The magnetic head carriage is further provided with an urging spring and an electromagnet. The urging spring is provided between the magnetic head carrier and magnetic head, and urges the magnetic head toward the platen member to press the magnetic head to the surface of a personal check. The electromagnet brings the magnetic head into contact with and separates from a personal check.

The characters printed on a personal check are read by the scanning unit, and the magnetic information printed in magnetic ink is read by the magnetic head. The image information read by the scanner and magnetic information read by the magnetic head are transferred to and collated by a host computer of a bank that handles the personal check. However, the volume of information is much and a certain transfer time is required. Further, a high-grade high-speed arithmetic element is necessary to handle the image information and magnetic information simultaneously in reading side.

As opportunity of using a personal check is increased, it is demanded to install a compact low cost unit as a reading apparatus for collating a personal check in a shop.

BRIEF SUMMARY OF THE INVENTION

A recording medium reading apparatus according to the present invention includes a path, a scanner, a pressing roller, a roller bracket, an MICR head, a pressing pad, and arm, a rotation cam, a roller lift member, a link member, and a driving mechanism. The path is provided for conveying a sheet-like recording medium. The scanner is placed in the path, and reads the image information that is displayed on one side of the recording medium and can be optically read. The pressing roller is opposed to the scanner on the other side of the path. The roller bracket supports the pressing roller, allowing the pressing roller to move in a direction extending from the path.

The MICR head is placed next to the scanner placed in the path, in a direction of conveying the recording medium, and reads the magnetic information printed on the recording medium. The pressing pad is opposed to the MICR head and placed on the other side of the path. The arm is supported by a rotation shaft extending along the path, and having one end to which the pressing pad is fixed.

The rotation cam has a swivel shaft, a spiral cam part, and a push-out cam part. The swivel shaft is placed in a direction crossing the path. The spiral cam part is formed around the swivel shaft. The push-out cam part extends in a radial direction of the swivel shaft from a far-end portion of the spiral cam part located in the side separated from the path. The roller lift member is fixed to the roller bracket and engages with the spiral cam.

The link member is supported to oscillate around the support shaft extending in the direction crossing the path. One end of the link member contacts the outer circumference of the push-out cam part, and the other end engages with the other end of the arm in the direction to rotate the arm in the direction in which the pressing pad leaves from the MICR head. The other end of the arm extends from the rotation shaft in the direction leaving from the path. The driving mechanism engages with the gear portion formed on the outer circumference of the rotation cam, and rotates the rotation cam in any direction around the swivel shaft.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 7 is a perspective view of the reading apparatus shown in FIG. 1, with the pressing roller separated from the scanner and the pressing pad is pressed to the MICR head;

FIG. 10 is a magnified perspective view of a rotation cam, a leaf spring, a roller lift member and a link member of the reading apparatus shown in FIG. 7, seen from the leaf spring side;

DETAILED DESCRIPTION OF THE INVENTION

Figure 1:
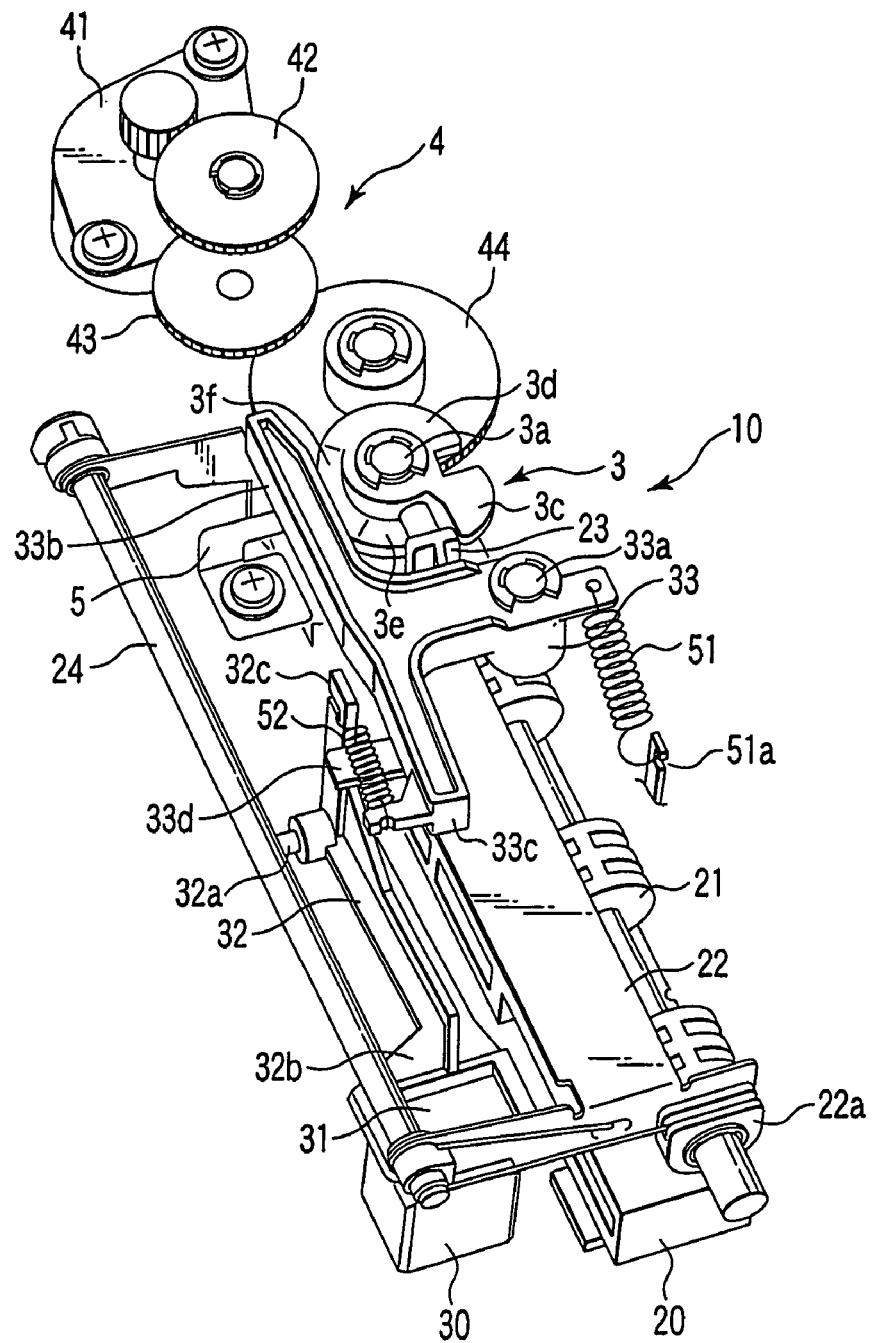
FIG. 1 is a perspective view of a reading apparatus according to an embodiment of the present invention, with a pressing roller pressed to a scanner and a pressing pad separated from a MICR head.

A reading apparatus 10 according to an embodiment of the present invention will be explained hereinafter with reference to FIGS. 1 to 14. The reading apparatus 10 shown in FIG. 1 has a path 1, a scanner 20, a pressing roller 21, a roller bracket 22, a MICR head 30, a pressing pad 31, an arm 32, a rotation cam 3, a roller lift member 23, a link member 33, a driving mechanism 4, and a leaf spring 5. The path 1 is provided to convey a sheet-like recording medium such as a personal check.

Figure 3:
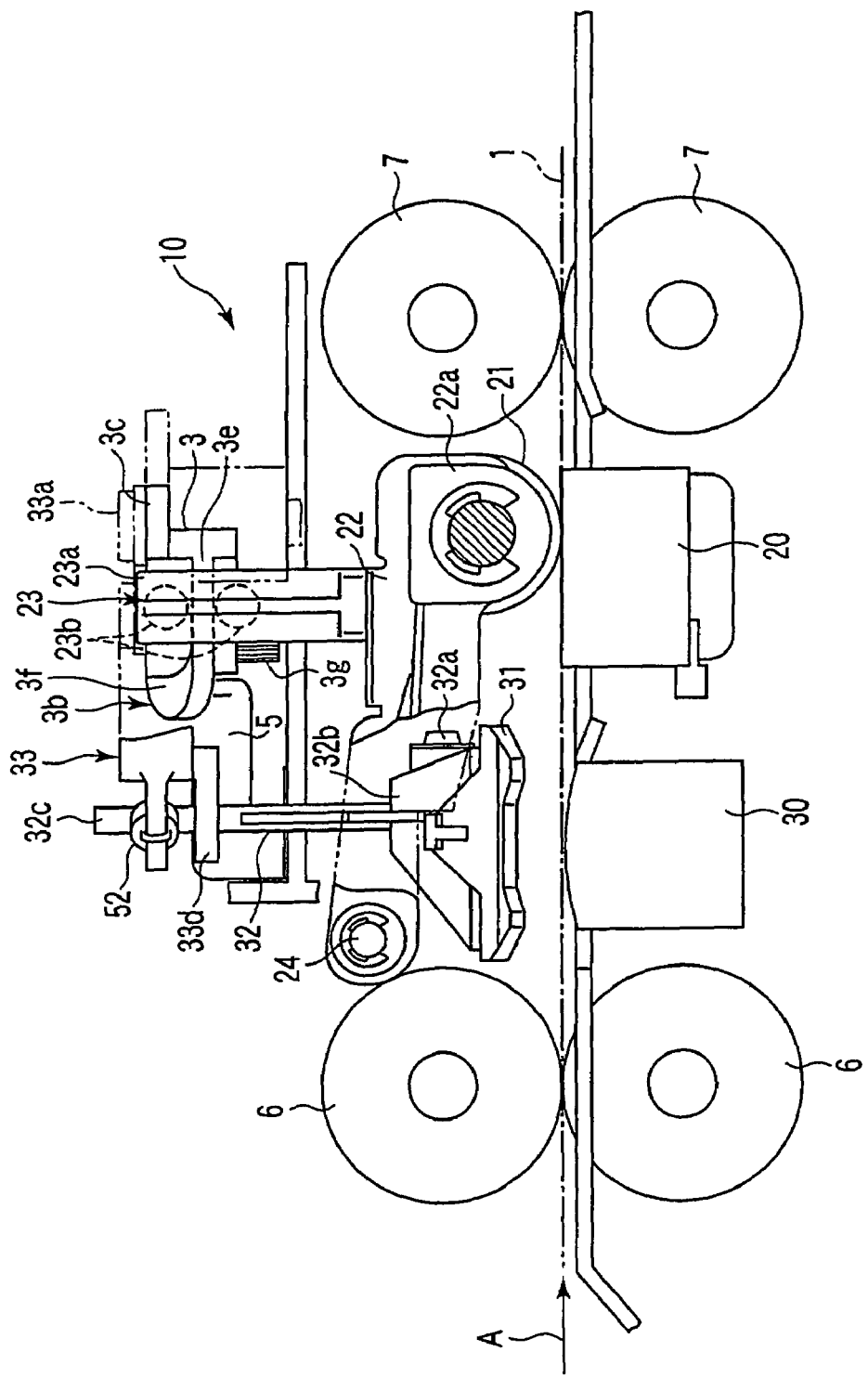
FIG. 3 is a side view of the reading apparatus shown in FIG. 1.

As FIG. 3 shows, the recording medium is inserted into the path 1 from the position where MICR head 30 is located, in the direction of arrow A, from the left to the right. As a matter of convenience for describing the embodiment in the description that follows, the location of the MICR head 30 side will be called as the upstream side and the scanner 20 side will be called as the downstream side of the path 1.

Figure 2:
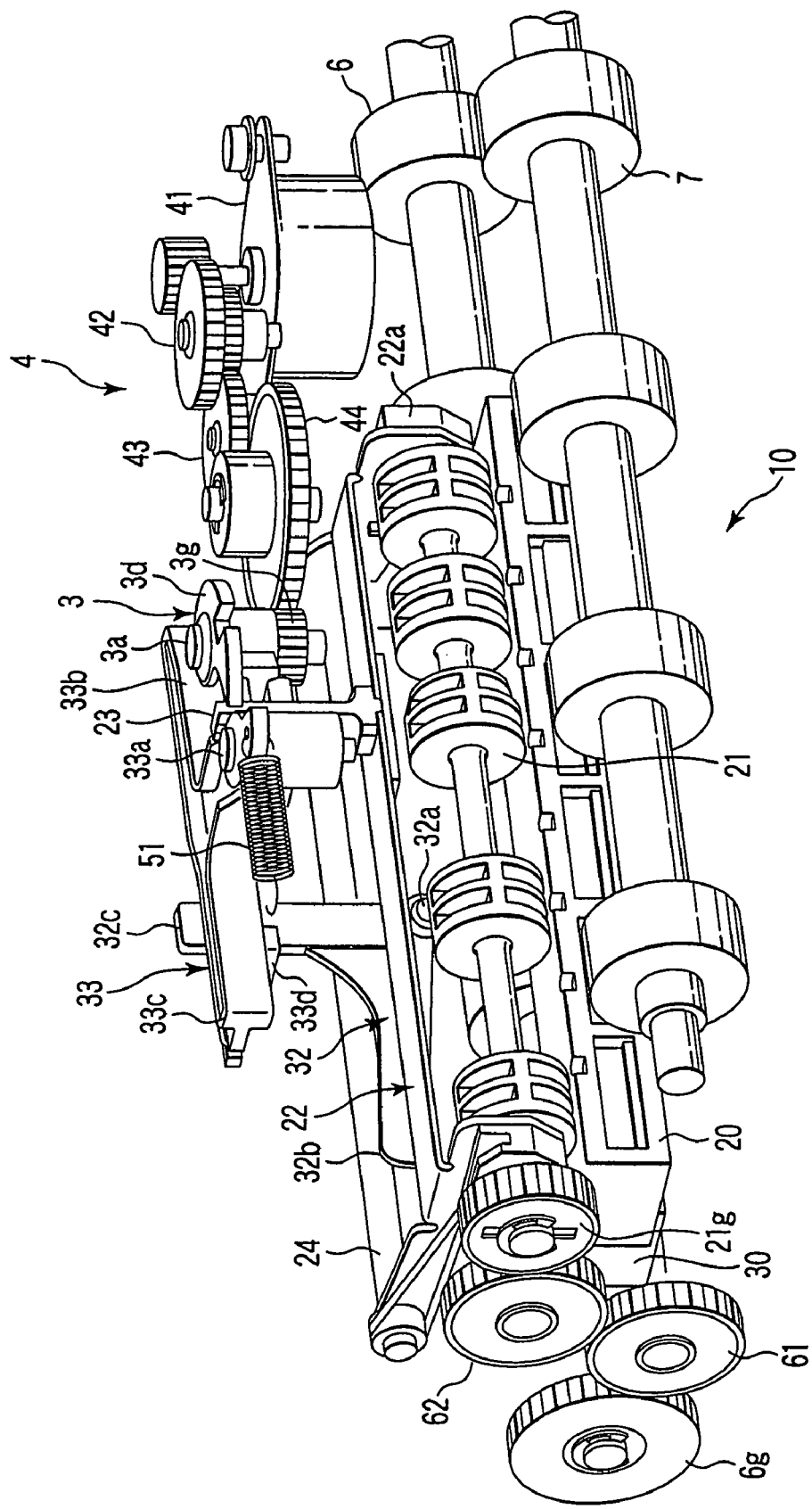
FIG. 2 is a perspective view of the reading apparatus shown in FIG. 1, seen from another angle.
Figure 4:
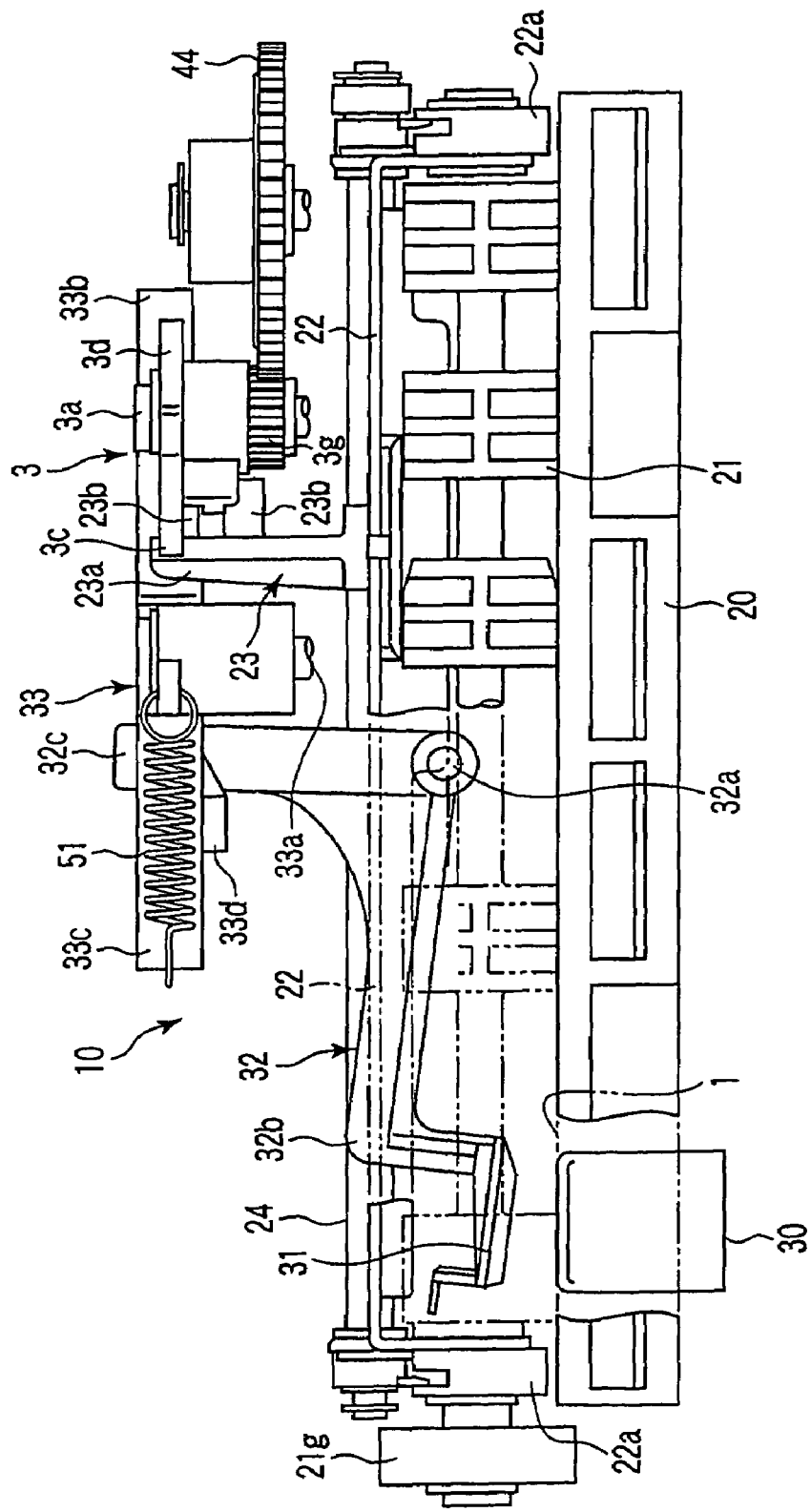
FIG. 4 is a side view of the reading apparatus shown in FIG. 3, seen from the pressing roller side.
Figure 5:
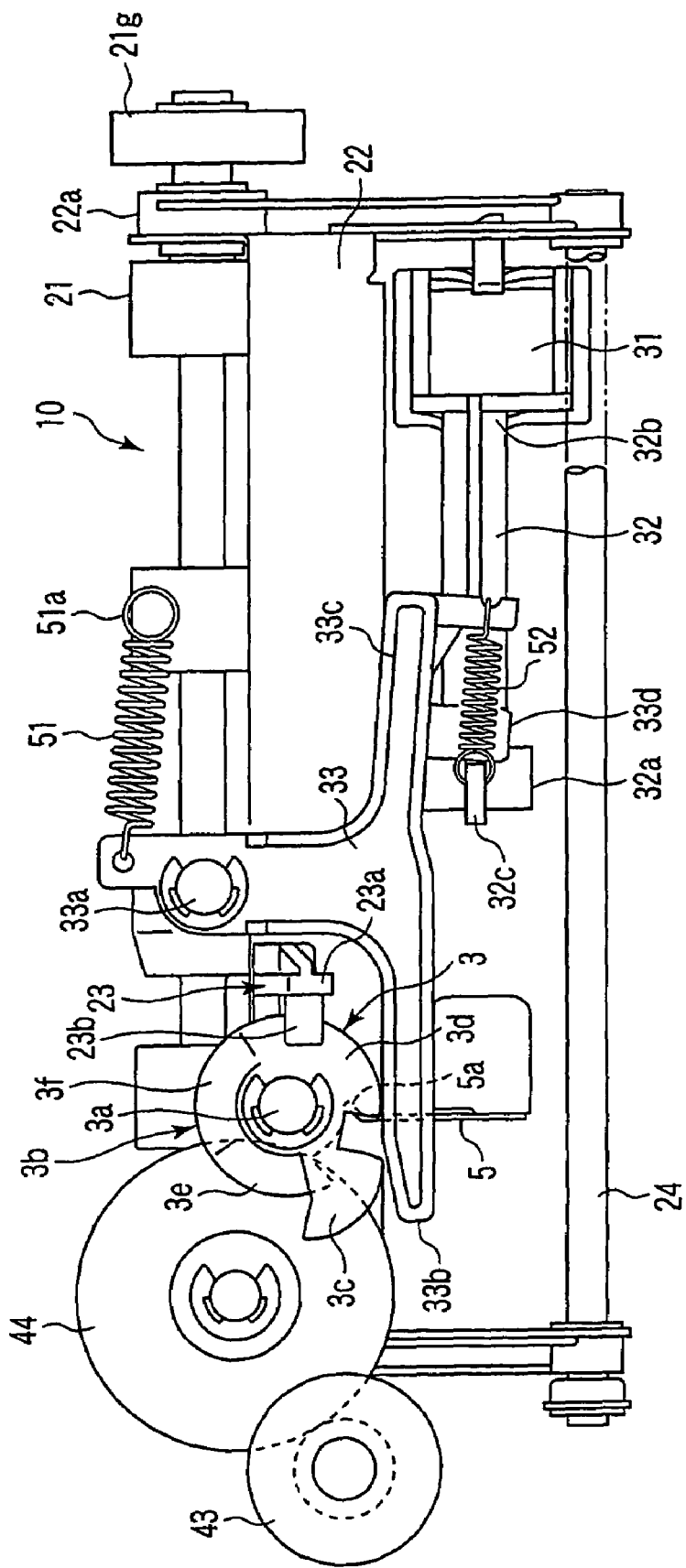
FIG. 5 is a top view of the reading apparatus shown in FIG. 1, with the pressing roller separated from the scanner and the pressing pad is separated from the MICR head.
Figure 6:
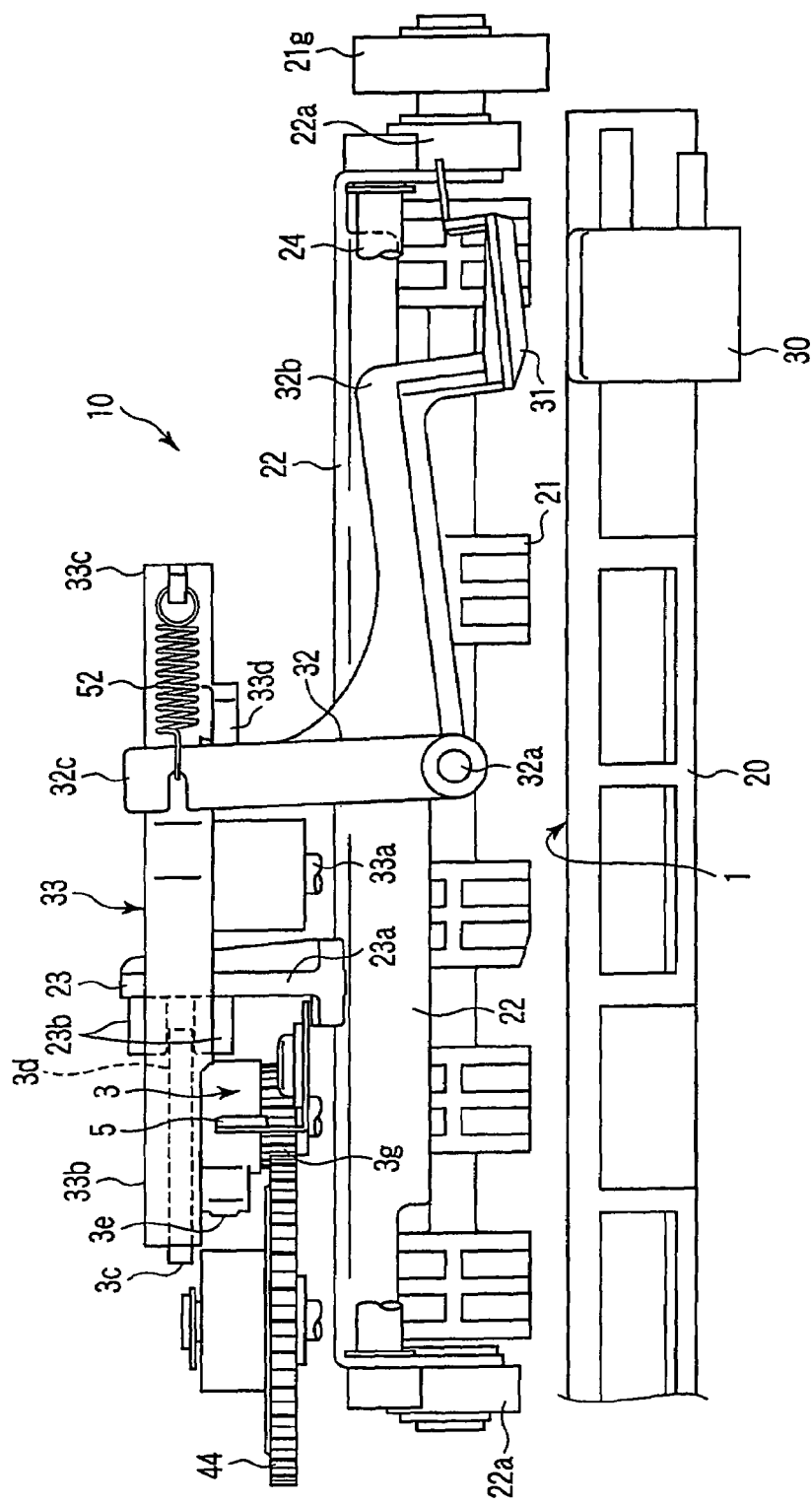
FIG. 6 is a side view of the reading apparatus shown in FIG. 5, seen from the pressing pad side.

The scanner 20 is placed in mid of the path 1, and reads the image information that is displayed on one side of a recording medium and can be optically read. The scanner 20 is provided over the width of the path 1 on which the recording medium passes. As shown in FIG. 3, the pressing roller 21 is located at the position facing the scanner 20 from the opposite side of the path 1. The pressing roller 21 has large diameter portions formed intermittently as shown in FIGS. 2 and 4, for securely reading a series of characters in the image information displayed on a recording medium.

The roller bracket 22 supports the pressing roller 21, allowing the pressing roller to move in a direction of extending from the path 1. The roller bracket 22 rotates around a rod 24 placed parallel to the pressing roller 21. Bearing blocks 22a holding the pressing roller 21 are attached to a roller bracket 22 with looseness.

The MICR head 30 reads the magnetic information printed on a recording medium. As shown in FIG. 3, the MICR head 30 is placed next to the scanner 20 on the upstream side along the path 1 in the direction of conveying a recording medium. The reading apparatus 10 handles media on which the MICR information is placed at a deviated position. Therefore, the MICR head 30 is located at the position where magnetic information exists, with respect to the width of the path 1.

The pressing pad 31 presses a recording medium to avoid floating when passing over the MICR head 30. Therefore, the pressing pad 31 is located at the position facing the MICR head 30 from the opposite side of the path 1, as shown in FIG. 3. The arm 32 is supported by the rotation shaft 32a located in the direction along the path 1. The arm 32 is L-shaped with a bend at the position of the rotation shaft 32a, and provided with the pressing pad 31 at one end 32b. The other end 32c of the arm 32 extends from the rotation shaft 32a to the direction separating from the path 1.

Figure 11:
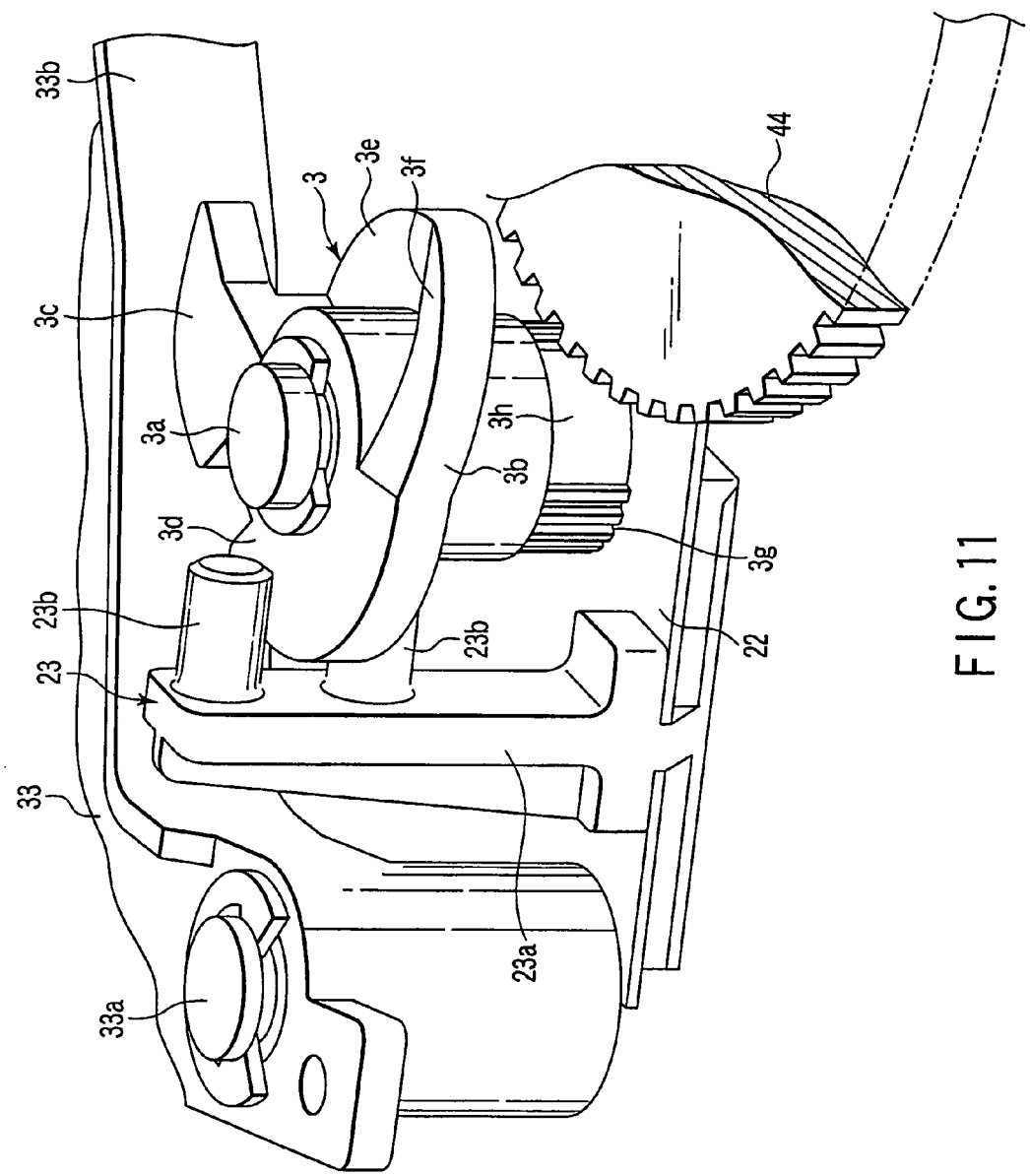
FIG. 11 is a magnified perspective view of the parts shown in FIG. 10, seen from the pressing roller side.

The rotation cam 3 is located on the same side as the pressing roller 21 with respect to the path 1, and has a swivel shaft 3a, a spiral cam part 3b, and a push-out cam part 3c. The swivel shaft 3a is arranged in a direction crossing the path 1. The spiral cam part 3b is formed almost one cycle around the swivel shaft 3a. The push out cam part 3c is provided at a far end portion 3d distant from the path 1, as shown in FIGS. 10 and 11.

The push out cam part 3c spreads in the radial direction of the swivel shaft 3a. A near end portion 3e of the spiral cam part 3b close to the path 1 is connected to the far end portion 3d clockwise through a slope portion 3f, as viewing along the swivel shaft 3a facing the path 1. The near end portion 3e is also connected to the push-out cam part 3c along the axis of the swivel shaft 3a.

The roller lift member 23 is fixed to the roller bracket 22 located close to the center in the width direction of the path 1. The roller lift member 23 comprises a mast 23a and a pair of posts 23b. The mast 23a stand up from the roller bracket 22 in the direction leaving from the path 1. The posts 23b extend from the mast 23a parallel to the direction extending the pressing roller 21. The posts 23b are provided sandwiching the spiral cam part 3b as shown in FIGS. 3 and 11, and engage with the spiral cam part 3b.

As the rotation cam 3 rotates, the roller lift member 23 is raised in the direction leaving from the path 1, or lowered in the direction approaching the path 1. FIG. 1, FIG. 2, FIG. 3 and FIG. 4 show the state in which the posts 23b engage with the rotation cam 3 at the near end portion 3e of the spiral cam part 3b. FIGS. 5 to 11 show the state that the posts 23b engage with the rotation cam 3 at the far end portion 3d of the spiral cam part 3b.

The part of the rotation cam 3 facing the path 1 side has a gear portion 3g to engage with the driving mechanism 4. The gear portion 3g has a toothless zone 3h that causes idle rotation of the driving mechanism 4. The toothless zone 3h is provided in a range to cause idle rotation of the driving mechanism 4 in the state that the rotation cam 3 rotates to the position where the far end portion 3d engages with the posts 23b.

A link member 33 is supported to oscillate around a support shaft 33a extending in the direction crossing the path 1. One end 33b of the link member 33 contacts the outer circumferences of the spiral cam part 3b and push-out cam part 3c. The other end 33c of the link member 33 has a hook piece 33d at the middle part. The hook piece 33d engages with the other end 32c of the arm 32 in the direction to rotate the arm 32 leaving the pressing pad 32 from the MICR head 30.

A first spring 51 is assembled to urge the link member 33 around the support shaft 33a in the direction of pressing one end 33b of the link member 33 to the outer circumference of the rotation cam 3. In this embodiment, the first spring 51 is a tension coil spring. The proximal end 51a of the first spring 51 is hung on a part of the housing that contains the reading apparatus 10, as shown in FIG. 1. The first spring 51 may be a torsion coil spring provided coaxially with the support shaft 33a between the support shaft 33a and link member 33.

The other end 33c of the link member 33 is connected to the other end 32c of the arm 32 by a second spring 52. The second spring 52 is a tension coil spring, and urges the arm 32 in the direction of pressing the pressing pad 31 to the MICR head 30, by pulling the other end 32c of the arm 32 to the other end 33c of the link member 33. Instead of a tensile coil spring, a tension coil spring may be provided as the second spring 52 between the rotation shaft 32a and arm 32.

The driving mechanism 4 comprises a motor 41, two reduction gears 42 and 43, and a transmission gear 44. The motor 41 is a pulse motor that can be driven in either clockwise or counterclockwise in the state facing the path 1 from the pressing roller 21. The output shaft 41a of the motor 41 is placed parallel to the rotation cam 3. The driving force is transmitted from a gear 41b fixed to the output shaft 41a to the transmission gear through the reduction gears 42 and 43. The transmission gear 44 is the output part of the driving mechanism 4, and engages with the gear portion 3g formed on the outer circumference of the rotation cam 3.

The leaf spring 5 is fixed for a third spring beside of the rotation cam 3, as shown in FIG. 1, FIG. 5, FIG. 9 and FIG. 10. In the state that the push-out cam part 3c comes in contact with one end 33b of the link member 33, the front end 5a of the leaf spring 5 contacts the near end portion 3e of the rotation cam 3 as shown in FIGS. 8 and 10, and bends a little.

Figure 8:
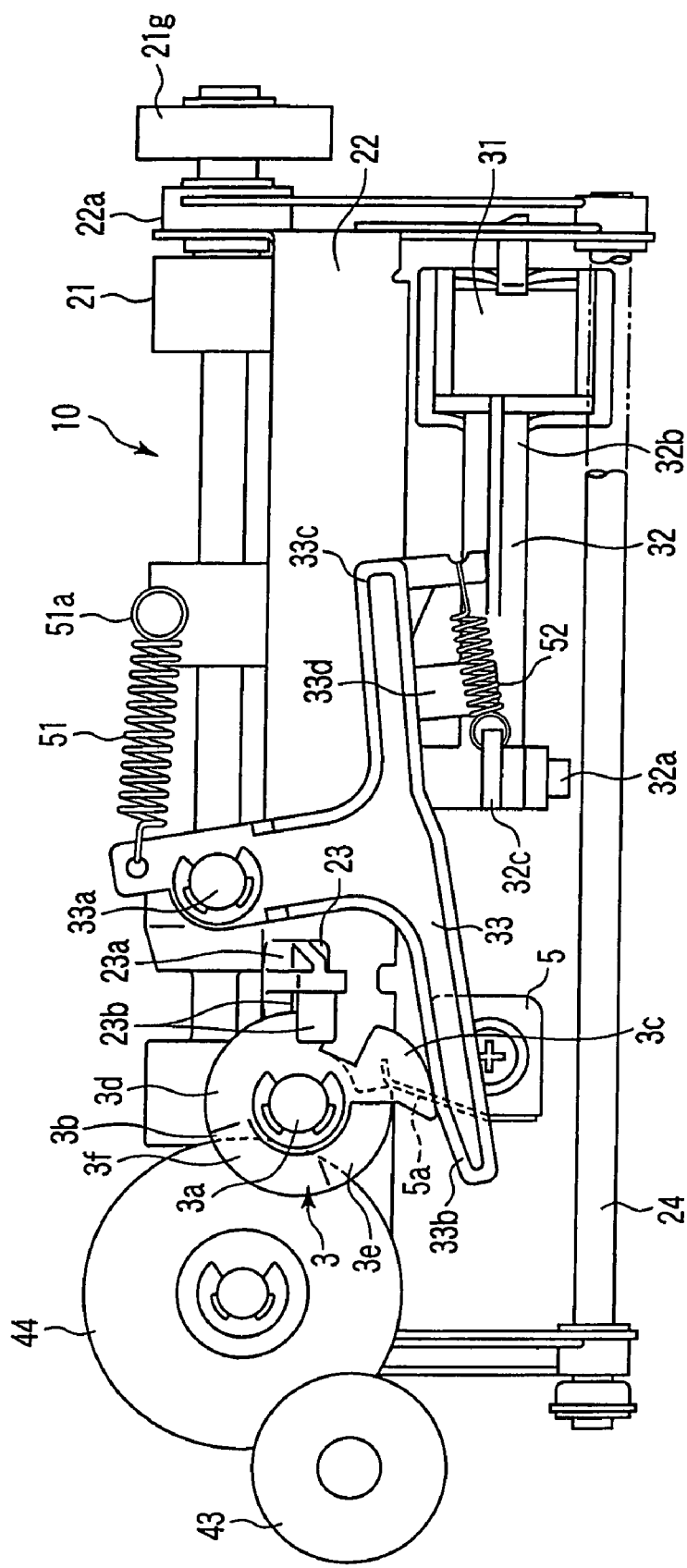
FIG. 8 is a top view of the reading apparatus shown in FIG. 7.
Figure 9:
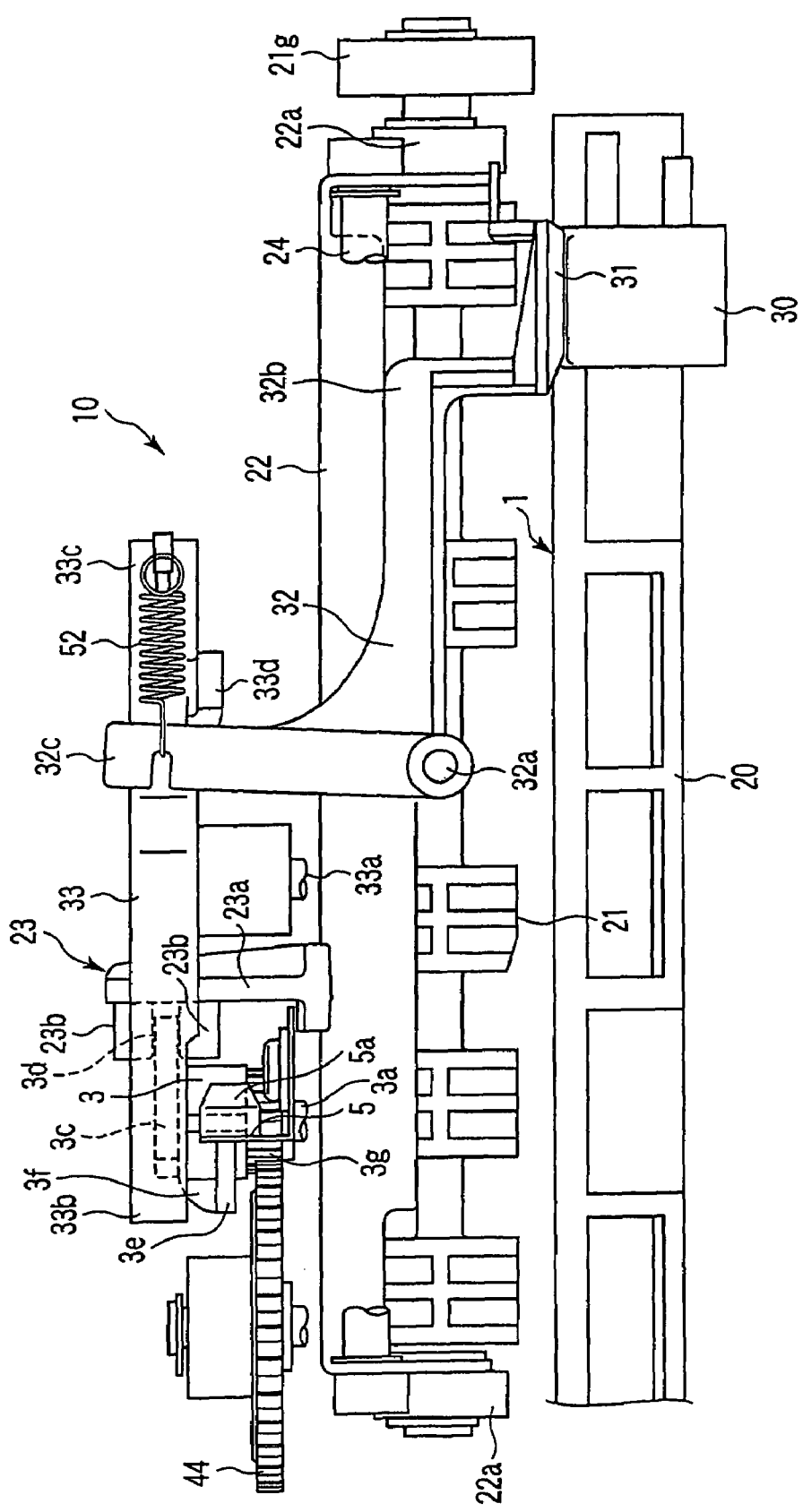
FIG. 9 is a side view of the reading apparatus shown in FIG. 7, seen from the pressing pad side.

Therefore, the rotation cam 3 is in the state urged clockwise in FIG. 8. At this time, the transmission gear 44 turns clockwise and goes into the toothless zone 3h. When the motor 41 rotates reversely, the transmission gear 44 goes out of the toothless zone 3h, and is easily returned to the gear portion 3g. Instead of the leaf spring 5, a torsion coil spring may be provided as a third spring between the swivel shaft 3a and rotation cam 3, to urge and turn the rotation cam 3 clockwise in FIG. 8.

Feeding rollers 6 and 7 are provided to convey a recording medium along the path 1. As shown in FIGS. 2 and 3, the feeding roller 6 is placed in the upstream side of the MICR head 30, and the feeding roller 7 is placed in the downstream side of the scanner 20. Coupling gears 21g and 6g are fixed to ends of the pressing roller 21 and feeding roller 6. The pressing roller 21 is connected to the feeding roller 6 through gear trains 61 and 62 at the position where the pressing roller 21 is pressed to the scanner 20, as shown in FIG. 2. The coupling gear 21g is released from the gear trains 61 and 62 at the position where the pressing roller 21 leaves from the scanner 20.

Figure 12:
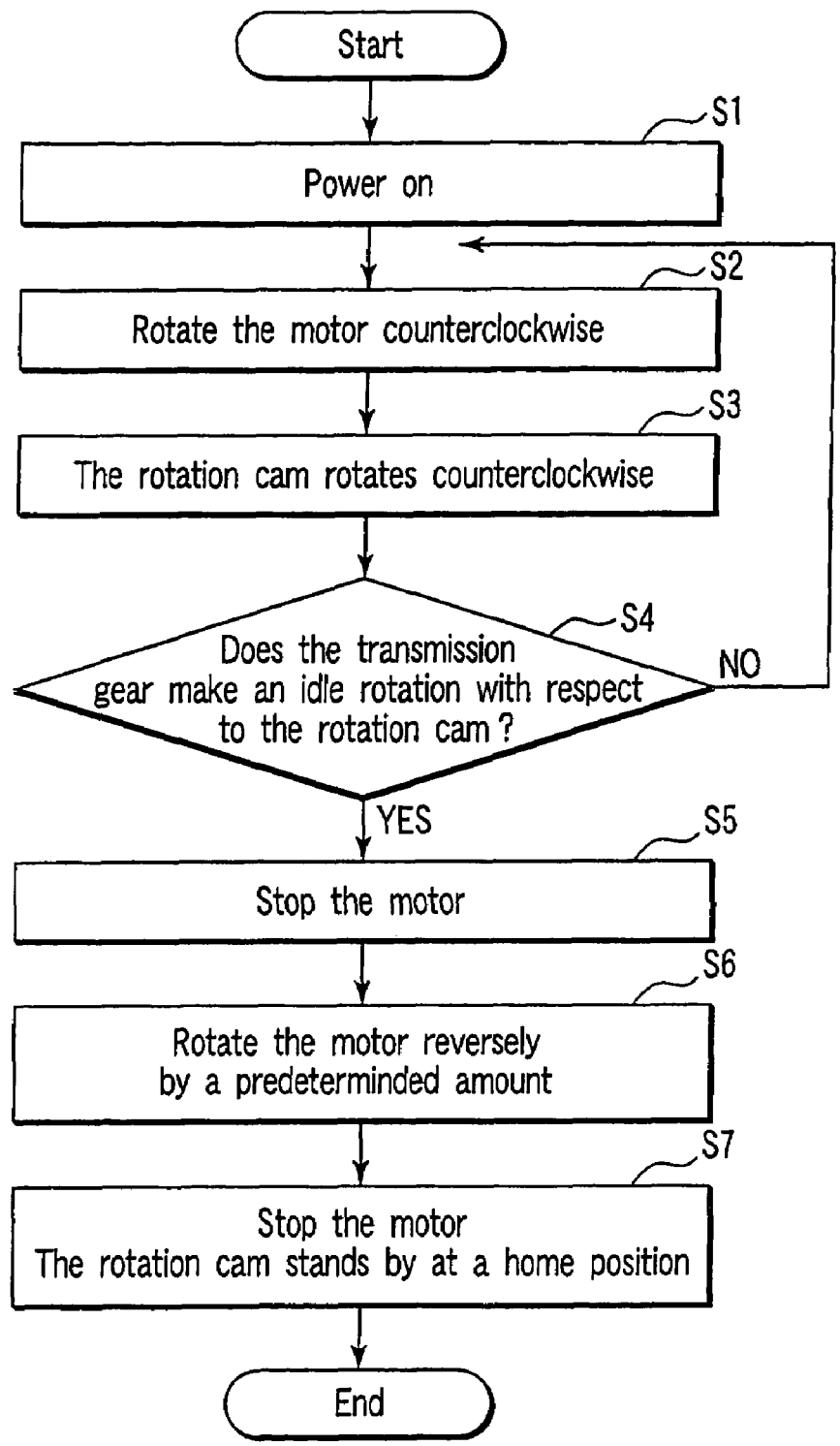
FIG. 12 is a flowchart showing the startup operation of the reading apparatus according to the present invention.

Now, explanation will be given on the operation of the reading apparatus 10 provided as described above. The flowchart of FIG. 12 shows the operation of the reading apparatus 10, from startup (S1) to standby state (S7). When the reading apparatus 10 is started (S1), the motor 41 is driven counterclockwise (S2). The rotation cam 3 is rotated counterclockwise (S3) until the transmission gear 44 reaches the position to get in the toothless zone 3h, as shown in FIGS. 7 to 11. When the idle rotation of the rotation cam 3 and transmission gear 44 is detected (S4), the motor 41 is stopped (S5). From this state, the motor 41 is driven clockwise so that the rotation cam 3 rotates clockwise by a certain angle. Concretely, the motor 41 is reversely rotated clockwise (S6) by a predetermined amount to become the state shown in FIGS. 5 and 6. The posts 23b of the roller lift member 23 engage with the far end portion 3d of the rotation cam 3, and the rotation cam 3 is rotated until the pressing roller 21 and pressing pad 31 reach the rotation position away from the path 1. In this state, the motor 41 stops, and the rotation cam 3 stands by at a home position shown in FIG. 5 (S7).

Figure 13:
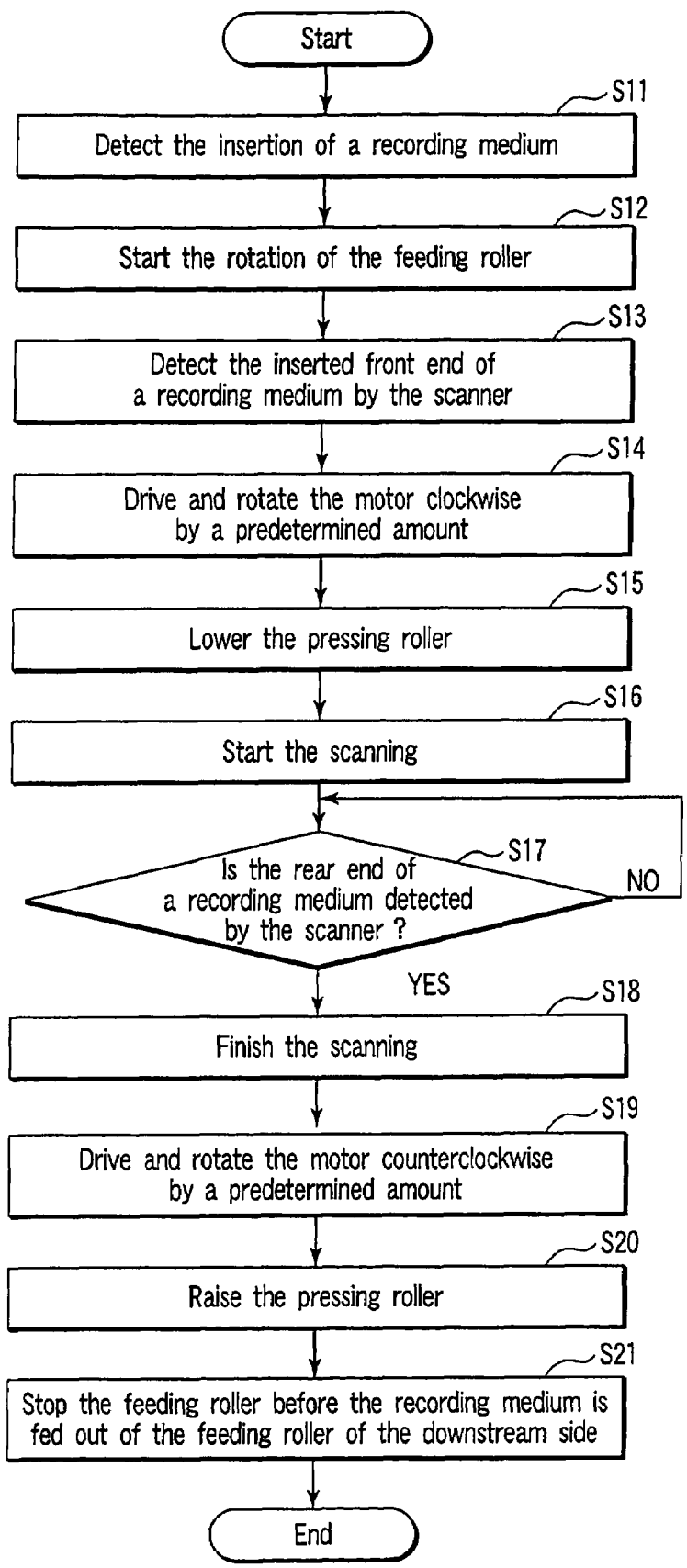
FIG. 13 is a flowchart showing the operation of the reading apparatus when reading image information.
Figure 14:
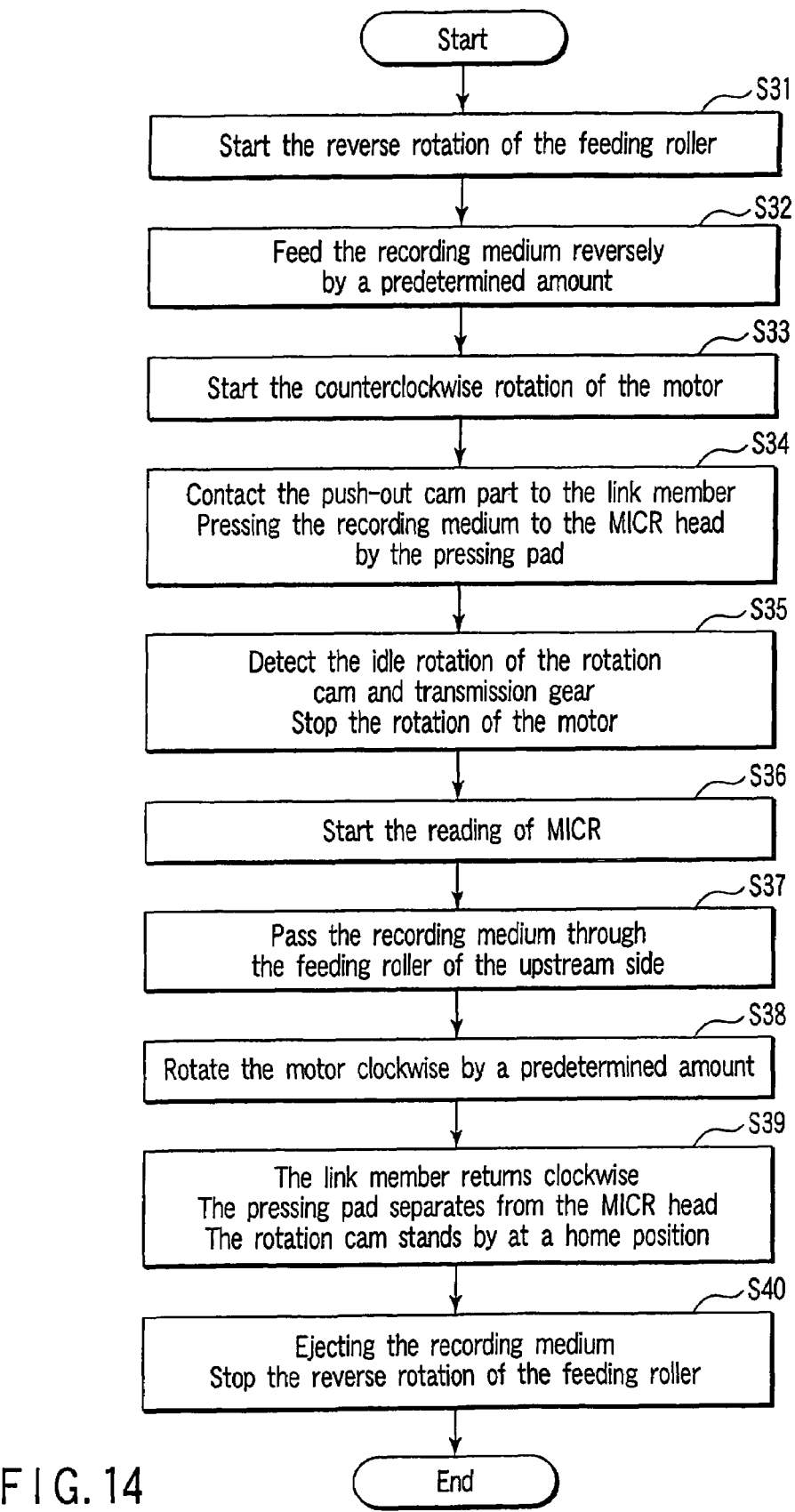
FIG. 14 is a flowchart showing the operation of the reading apparatus when reading magnetic information.

Next, the scanning operation will be explained with reference to FIG. 13. When it is detected that a recording medium is inserted from the left side in FIG. 3, or from the feeding roller 6 side close to the MICR head (S11), the feeding rollers 6 and 7 start to rotate (S12). Then, when the inserted end of the recording medium is detected by the scanner 20 (S13), the motor 41 is driven clockwise by a predetermined amount (S14). As a result, the rotation cam 3 rotates clockwise, and the post 23b of the roller lift member 23 engages with the near end portion 3e of the spiral cam part 3b.

As shown in FIGS. 1 to 4, the roller bracket 22 lowers the pressing roller 21 to the position to contact the scanner 20 (S15). The coupling gear 21g of the pressing roller 21 is connected to the coupling gear 6g of the feeding roller 6 through the gear trains 61 and 62, and conveys the recording medium in the same direction as the feeding rollers 6 and 7. In this state, scanning of the visible image information displayed on the recording medium is started (S16).

Reading is finished (S18), based on the detection by scanner 20 of the inserted front end and opposite rear end of the recording medium (S17). The motor 41 is driven and rotated counterclockwise by a predetermined amount up to return the rotation cam 3 to a home position (S19). The roller bracket 22 is raised together with the pressing roller 21 in the direction away from the scanner 20, so that the posts 23b of the roller lift member 23 engages with the far end portion 3d of the spiral cam part 3b. Thereafter, the rotation of the feeding rollers 6 and 7 is stopped (S21), before the recording medium is fed out from the feeding roller 7 that becomes the downstream side of the scanner 20, based on the insertion side.

Next, the MICR reading operation will be explained. The recording medium inserted into the reading apparatus 10 is ejected from the insertion slit side after the image information is read from it. The MICR reading operation is executed simultaneously in the process of conveying the recording medium in the reverse direction for ejecting the medium.

The MICR reading operation is started immediately after the feeding rollers 6 and 7 are stopped in the final step (S21) of the scanning operation. First, the feeding rollers 6 and 7 start rotating reversely in the direction of returning the recording medium to the insertion side (S31). Then, the motor 41 of the driving mechanism 4 is rotated counterclockwise (S33), so that the rotation cam 3 rotates counterclockwise from the state shown in FIG. 5, after the recording medium is moved by a predetermined length along the path 1 (S32).

As shown in FIG. 8, when the rotation cam 3 rotates and the push-out cam part 3c contacts the link member 33, the link member 33 rotates counterclockwise around the support shaft 33a. Since the hook piece 33d leaves from the other end 32c of the arm 32, the other end 32c of the arm 32 is pulled by the second spring 52. As a result, the arm 32 is rotated, and the pressing pad 31 is pressed onto the MICR head 30. At this time, as the recording medium has been conveyed in the reverse direction, the recording medium is pressed onto the MICR head 30 by the pressing pad 31 (S34).

The idle rotation of the gear portion 3g of the rotation cam 3 and transmission gear 44 is detected, and the rotation of the motor 41 is stopped (S35). In this state, reading of MICR that is magnetic information is started (S36). While the recording medium is being fed reversely to the insertion side by the feeding rollers 6 and 7, the printed MICR is read. When the recording medium passes through the MICR head 30 and is fed out of the feeding roller 6 of the insertion side (S37), the motor 41 is driven again and rotated clockwise by a predetermined amount necessary for the rotation cam 3 to return to a home position (S38).

As the link member 33 is urged by the first spring 51, it rotates clockwise while contacting the outer circumference of the spiral cam part 3b of the rotation cam 3. Since the hook piece 33d contacts the other end 32c of the arm 32 during rotation of the link member 33, the pressing pad 31 is raised in the direction away from the MICR head 30. The rotation cam 3 rotates to a home position, and goes into the standby state shown in FIGS. 5 and 6 (S39). The recording medium is ejected to the insertion slit side. When the ejection of the recording medium is detected, the reverse rotation of the feeding roller 6 is stopped (S40).

It is permitted to control the timing of driving the motor 41 to rotate the rotation cam 3 in the MICR reading operation, based on the length of the recording medium measured by the number of rotations of the feeding rollers 6 and 7 in the scanning operation.

As described above, in the reading apparatus 10, one driving mechanism 4 performs the operation of pressing the recording medium to the scanner 20 for reading the image information, and the operation of pressing the recording medium to the MICR head 30 for reading the MICR information. Therefore, compared with a reading apparatus having respective driving systems, the reading apparatus 10 is smaller in overall the whole dimensions and low in product cost. This contributes to wide use of a reading apparatus in retail shops.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the inventive as defined by the appended claims and equivalents thereof.

What is claimed is:

1. A reading apparatus comprising:
   a path for conveying a sheet-like recording medium;
   a scanner which is placed in the path, and reads image information that is displayed on one side of the recording medium and can be optically read;
   a pressing roller which is placed at opposed to the scanner on the other side of the path;
   a roller bracket which supports the pressing roller, allowing the pressing roller to move in a direction extending from the path;
   an MICR head which is placed next to the scanner placed in the path, in a direction of conveying the recording medium, and reads magnetic information printed on the recording medium;
   a pressing pad which is opposed to the MICR head and placed on the other side of the path;
   an arm which is supported by a rotation shaft extending along the path, and having one end to which the pressing pad is fixed;
   a rotation cam which has a swivel shaft placed in a direction crossing the path, a spiral cam part formed around the swivel shaft, and a push-out cam part extending in a radial direction of the swivel shaft from a far-end portion of the spiral cam part located in the distant side from the path;
   a roller lift member which is fixed to the roller bracket and engages with the spiral cam;
   a link member which is supported to oscillate around the support shaft extending in the direction crossing the path, and has one end that contacts the outer circumference of the push-out cam part, and the other end that engages with the other end of the arm extending from the rotation shaft in a direction leaving from the path, in the direction to rotate the arm in the direction in which the pressing pad leaves from the MICR head; and
   a driving mechanism which engages with the gear portion formed on the outer circumference of the rotation cam, and rotates the rotation cam in any direction around the swivel shaft.

2. The reading apparatus according to claim 1, further comprising:
   a first spring which urges the link member around the support shaft in the direction of pressing one end of the link member to the outer circumference of the push-out cam part; and
   a second spring which pulls the other end of the link member and the other end of the arm.

3. The reading apparatus according to claim 1, wherein the gear part has a toothless zone which cause idle rotation of the driving mechanism while the push-out cam part remain in contact with the link member, further comprising:
   a third spring which contacts a near end portion of the spiral cam part located close to the path, and urged the rotation cam, to rotate the rotation cam around the swivel shaft, while the push-out cam remains in contact with the link member.

4. The reading apparatus according to claim 1, further comprising a feeding roller which moves the recording medium on both sides sandwiching the scanner and MICR head, along the path.

5. The reading apparatus according to claim 1, wherein the driving mechanism has a motor which rotates in either forward or reverse direction, and at least one reduction gear which is interposed between the motor and rotation cam.

6. The reading apparatus according to claim 1, wherein the pressing roller comes close to the scanner when the roller lift member engages with the near end portion of the spiral cam part on the side close to the path, and the pressing pad comes close to the MICR head when one end of the link member contacts the push-out cam part.

* * * * *